G. H. NOBBS.
TRACTOR.
APPLICATION FILED AUG. 23, 1919.
1,366,019.
Patented Jan. 18, 1921.
4 SHEETS—SHEET 2.
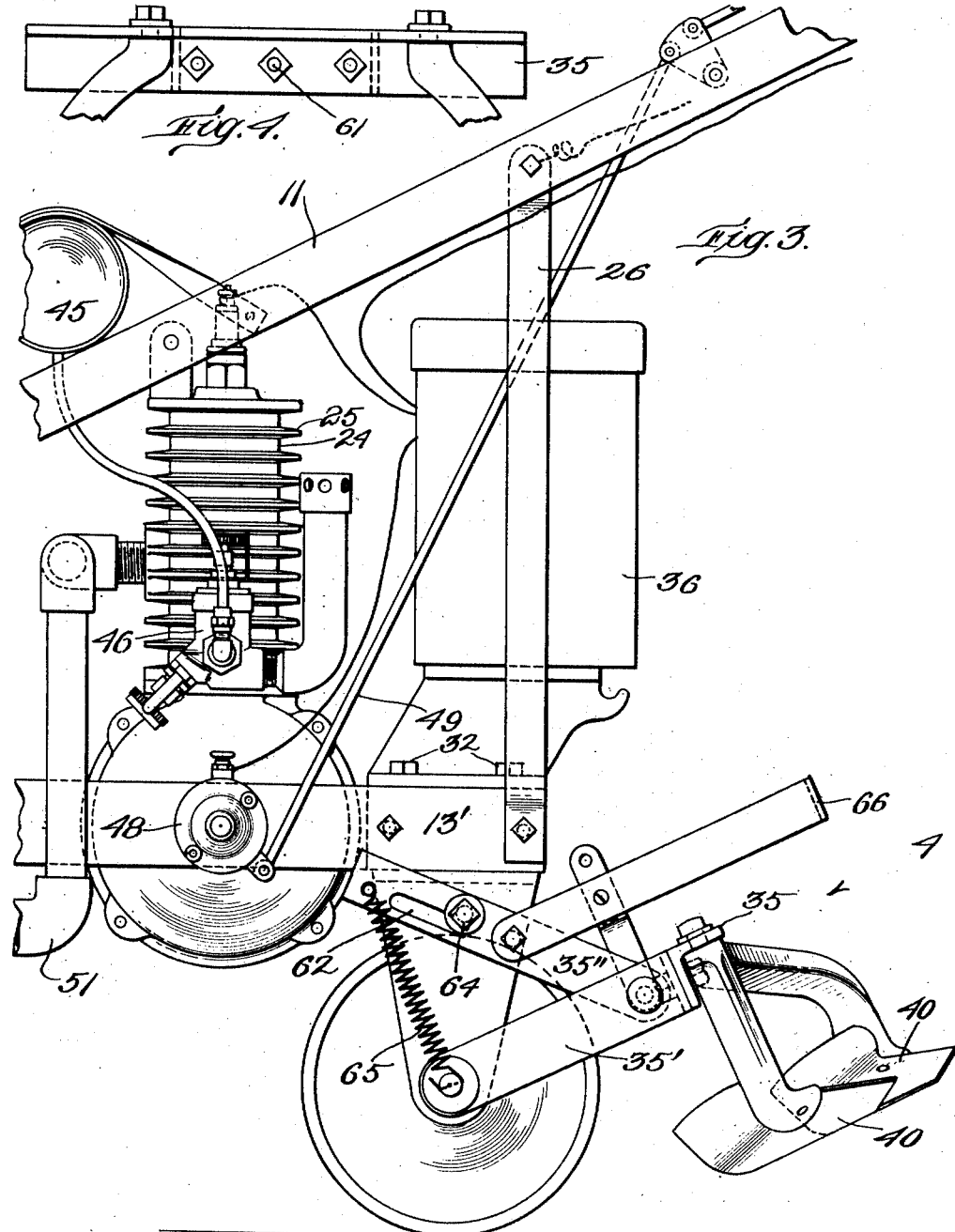
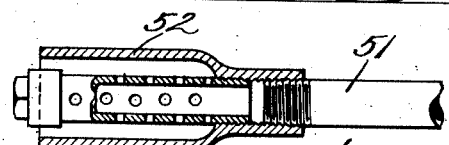
Inventor:
GEORGE H. NOBBS,
by Mitchell, Chadwick & Kent
attys.

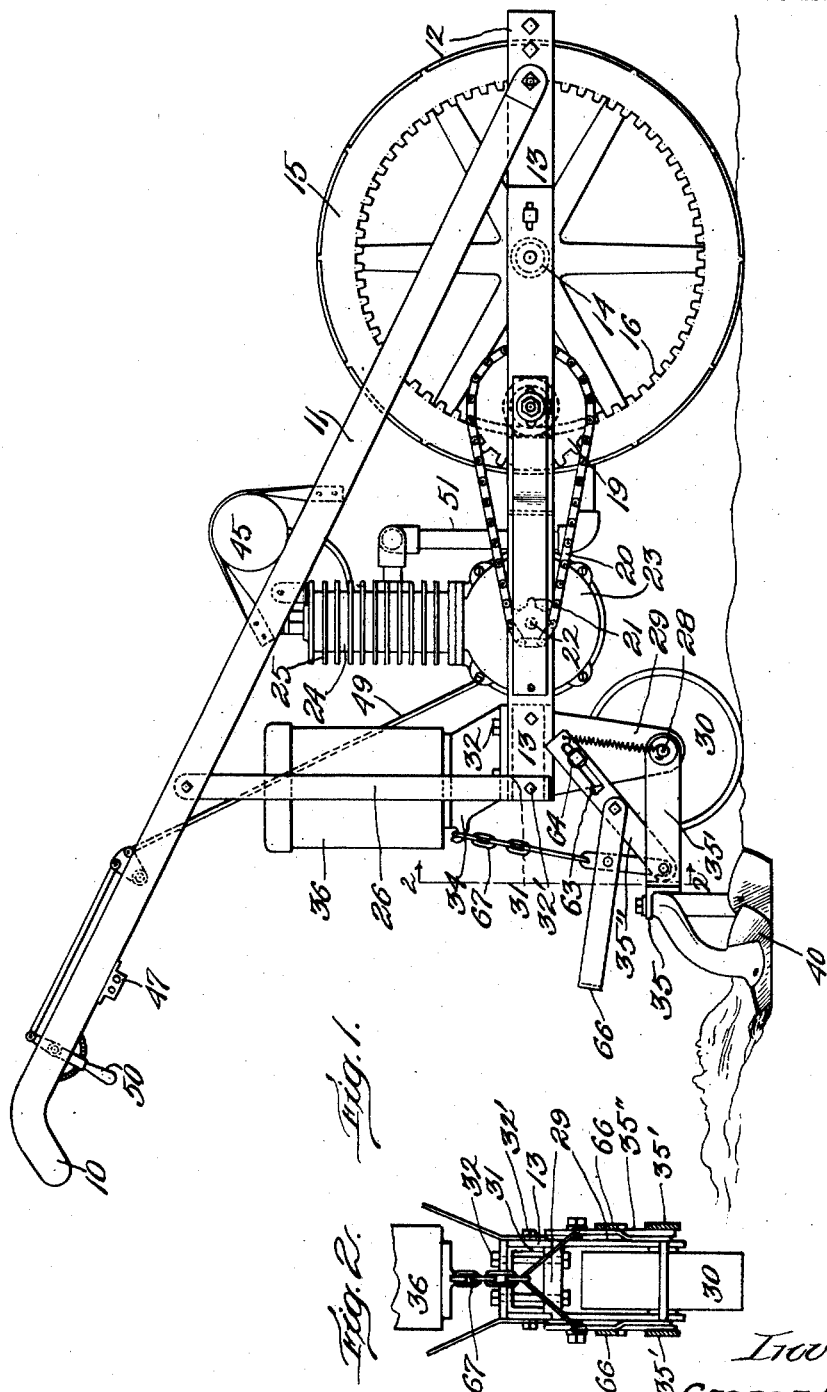

Inventor:
GEORGE H. NOBBS,
by Mitchell Chadwick Kent
attys.

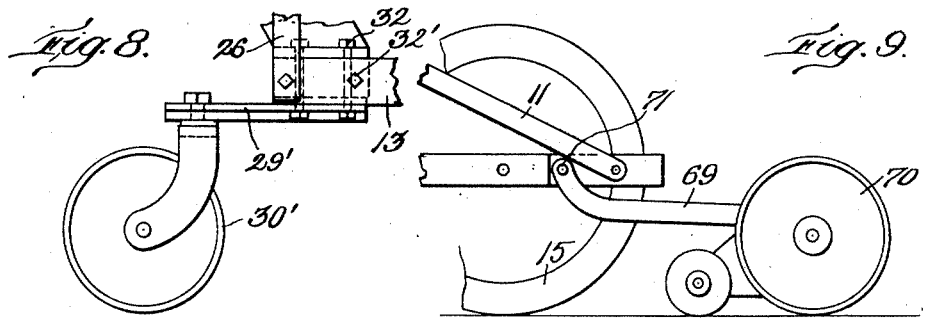
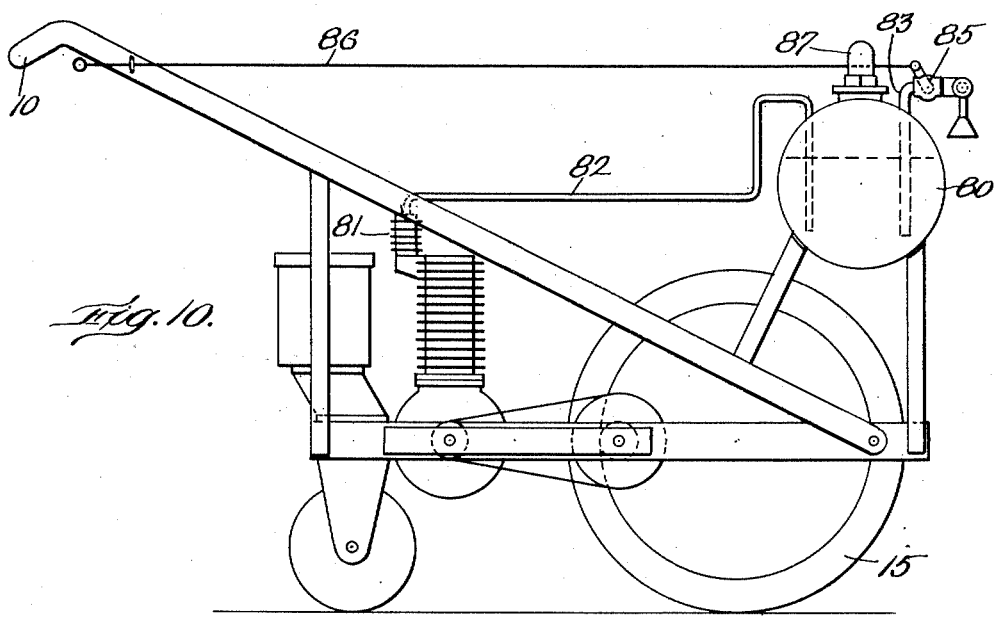
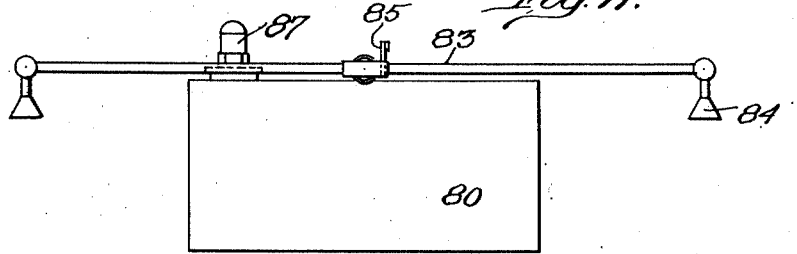

UNITED STATES PATENT OFFICE.

GEORGE H. NOBBS, OF JAMAICA PLAIN, MASSACHUSETTS.

TRACTOR.

1,366,019.  Specification of Letters Patent.  Patented Jan. 18, 1921.

Application filed August 23, 1919. Serial No. 319,379.

*To all whom it may concern:*

Be it known that I, GEORGE H. NOBBS, a citizen of the United States, residing at Jamaica Plain, in the county of Suffolk and State of Massachusetts, have invented certain new and useful Improvements in Tractors, of which the following is a specification.

This invention relates to improvements in tractors. More particularly it relates to tractors adapted for a variety of agricultural, industrial, domestic and other uses, such as drawing a cultivator or other tool between growing crops; pushing a lawn mower; drawing a truck or carrying a load. Hitherto garden tractors have been made to straddle a row; but these can be used only while the growing crop is low, and sometime, as in the case of whips grown by nurserymen only when the shoots are so young as not even to touch the straddling machine. Moreover, such machines can be used only when the rows are a certain distance apart, according to the spread of the machine; and if the rows be planted to correspond they are farther apart than conditions would sometimes otherwise require, which prevents the efficient use of the available area of land. It is an especial object of the invention to provide a tractor which can be handled conveniently by one man walking and guiding it between rows separated at any distance, or on a side hill; which can be conveniently stopped and started at any instant; can make a short turn,—as at the end of a furrow; can be steered nearer to a row, or farther from it, by a direct action which will tend to clear a path for itself when the crops are high and overhanging its path; can operate on two rows at once, and in some cases on more; and which while providing necessary power shall in general be light in weight, simple and durable in construction, low in cost and convenient to manipulate.

In attaining these general objects it is a feature of the invention to provide a single traction wheel, guided by a man walking behind through the medium of handles on a frame which carries the engine; also to have no clutch between the engine and the tractor wheel. The engine and the tractor wheel, permanently geared together, may in ordinary operation run continuously; but there is a tandem supporting wheel for the frame, preferably to the rear of the traction wheel and under a central part of the apparatus, on which the whole apparatus can be supported and swung, as on a pivot, at any instant, by depressing the handles still farther to the rear, to lift the tractor wheel from the ground, thus immediately stopping the traction, although the tractor wheel may continue to rotate. The apparatus can be moved on the rolling support into another furrow or to avoid an obstacle, or trundled anywhere somewhat as a wheelbarrow is trundled, or allowed to stand with the traction wheel running in air. As the wheel and head of the apparatus are relatively narrow, and the handles at the rear are spread to much greater breadth, the whole can be tipped readily toward either side, which aids in the manipulation of the traction.

It is another feature that the tool which is being drawn, such as a cultivator, can be quickly and conveniently raised from the ground by a manipulation of part of the apparatus, while it is in motion if desired, or can be easily restored. Another feature provides for setting the tool that is being drawn at an angle to the horizontal, for working on a side hill with the apparatus upright, balanced in its normal way against the pull of gravity. Another feature provides for adapting the apparatus to various kinds of traction work, by permitting the use of either a fixed or a caster support, and for pushing or for pulling. Still another feature provides for the performance of additional functions requiring power as the tractor moves along, as for example to maintain automatically a spray of insect poison toward each side, or downward upon several rows in some cases. Other features of the invention and details of the means by which these objects are accomplished will appear from the description which follows; but it will be understood that the particular apparatus shown does not illustrate all of the various forms which the invention may take. It is intended that the patent shall cover, by suitable expression in the appended claims, whatever features of patentable novelty exist in the invention disclosed.

In the accompanying drawings,—

Figure 1 is a right side elevation of an embodiment of the invention;

Fig. 2 is a rear end elevation of a detail of Fig. 1;

Fig. 3 is an elevation of the rear part of the left side on a larger scale;

Fig. 4 is a view of a detail, looking in the direction of the arrow 4 in Fig. 3;

Fig. 5 is a section of a detail, the muffler of the engine;

Fig. 8 is a side elevation of the rear part, showing a caster substituted for the supporting wheel of Fig. 1;

Fig. 9 is a side elevation of the forward part which shows the tractor as it may be used to push something, a lawn mower being indicated;

Fig. 10 shows the apparatus in side elevation as it may be arranged to spray growing crops; and Fig. 11 is an end elevation of a detail of Fig. 10.

Figure 7:
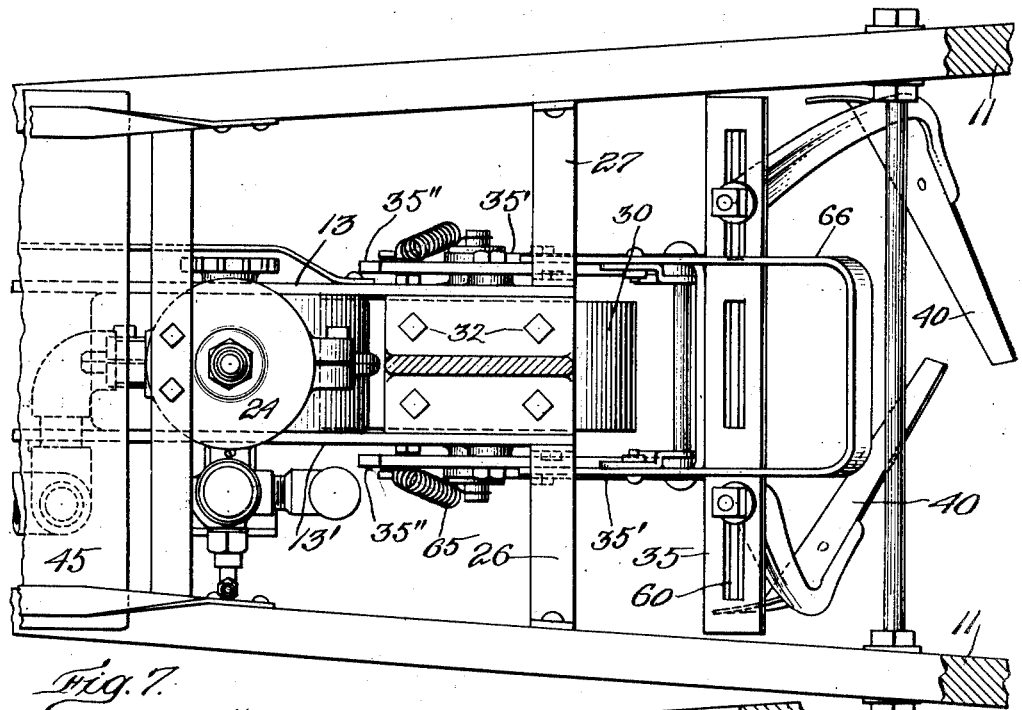
Figs. 6 and 7 are plans, respectively of the forward part and of the main portion next to the rear thereof, the latter being substantially the same portion as that whose side elevation is seen in Fig. 3, and both having certain upper parts cut away in order more clearly to show parts that would otherwise be hidden.
Figure 6:
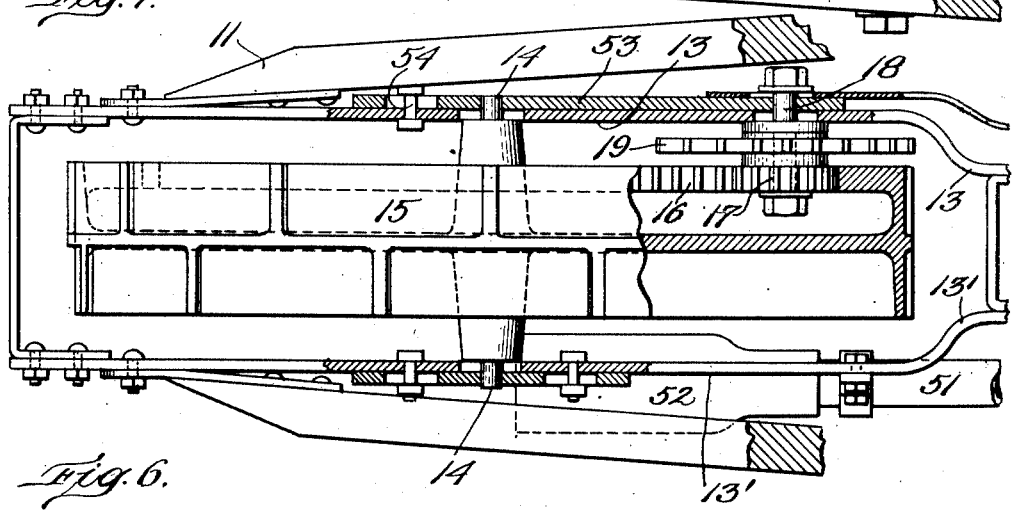

Referring to the drawings, 10 indicates handles, conveniently spread, as in a plow or other garden implement, from which the main fore and aft members 11 of a frame converge forward and downward to a transverse forward bar 12, which is joined also to the forward ends of horizontal fore and aft members 13, 13'. Of the latter, 13 on the right and 13' on the left support the journal bearings 14 of the traction wheel 15. As illustrated these are simple journals, but obviously different bearings might be substituted. The traction wheel which has an internal gear 16, is driven by a pinion 17, meshing therein. This pinion 17 is mounted on a stud 18 clamped on the side bar 13 and is integral with a large sprocket wheel 19 driven by a chain 20 from a small sprocket wheel 21 on the shaft 22 of an engine, the outline of whose crank case 23, cylinder 24, and ribs 25 for air cooling, are clearly seen in the drawing. The horizontal side bars 13 are maintained correctly spread at their rear by a spreader yoke 29 below and spreader channel piece 31 above, (Fig. 2) which all are clamped together between the rear parts of side bars 13 by vertical bolts 32 and transverse horizontal bolts 32', the former of which hold also a base on which may be supported any desired part of the apparatus, or other matter of load. The said yoke affords journals for a rear ground wheel 30 and connection for a draw bar 35 for holding any tool 40 that is being drawn below the level of the wheels. As illustrated in Fig. 1 the base has a web 34 rising centrally to a support for a battery box 36, for supplying electric energy for ignition of the gasolene engine 24. Uprights 26 and horizontal cross bars 27 are provided as needed so that the frame as a whole is sufficiently strong. With this simple bracing a frame is provided which is essentially narrow, is strong, and is easily manageable, either to steer, to tip sidewise, to stop or start the traction, or to assist the engine or tractive power if desired by manual pushing in places of particular need. The apparatus viewed broadly, presents a triangular aspect both in plan and in elevation, with the apexes of both the vertical and the horizontal triangles forward, and with the sides 26, 27 opposite the apex angles constituting struts to transmit strongly the manipulating forces applied by the operator at the handles 10 in either direction. This arrangement approximates the shape of a semipyramid whose axis is horizontal. The low and narrow apex has the traction wheel, which thus can enter under overhanging crops and gradually lift and spread them without injury as its broadening and rising upper side 11 advances. The draft meanwhile is transmitted at a low elevation through the horizontal members from the axle of the traction wheel to the yoke 29. The forward width may be so narrow as to give only proper clearance to the traction wheel, at the level of the axle thereof; midway it requires only breadth of the engine and its associated apparatus; and the upper bars may spread as wide and extend as far to the rear as is sufficient and convenient for handles for a man to manipulate the apparatus. The frame thus constituted incloses the engine and normally rests on both the said traction wheel 15 and the rear supporting small wheel 30, which are arranged tandem. The latter constitutes a sort of foot under the rear part of the frame, and for some purposes might be a mere shoe or plate to engage the ground, but preferably it is a roller or wheel as illustrated, turning on the shaft 28. This wheel and the apparatus which is carried on the frame may be so positioned with respect to each other that the main part of the weight is supported on the traction wheel 15. However, by arranging a design with the spreader yoke which holds the shaft 28 farther forward or backward, and by setting the battery box 36 and engine 24 forward or backward, the balance about the tread of the roller 30 may be arranged either to impose more of the weight on the traction wheel and so to increase its tractive power; or to place more of the total weight over or behind the roller 30 and so to reduce the effort required of the man operator when by depressing the handles 10 he lifts the traction wheel 15 from the ground, swinging the whole apparatus about the roller 30. The engine may be of any suitable type, gasolene, electric motor, or other. As illustrated it is provided with a gasolene supply tank 45 delivering to a carbureter 46; and the ignition is controlled by current from a battery in box 36, which flows through a button switch (Fig. 1) conveniently located on a handle 10 within the operator's reach, the course of the wires being indicated diagrammatically (Fig. 3). The wiring is by a commutator 48 on the engine shaft, the setting of which to advance or retard the ignition is under control of a rod 49 worked by a lever 50 close to the operator's hand. No throttle is illustrated, but such might be similarly or otherwise arranged if it were desired to have one. The exhaust is through a pipe 51 and muffler 52.

Any suitable connection may be made from engine to traction wheel. In that illustrated the sprocket wheel 21 is rigid on the engine shaft and the sprocket wheel 19 is rigid on the same shaft with the pinion 17 which is set at a rigidly fixed distance from the axle 14 of the traction wheel, which rigid distance is maintained by a side bar 53 in which the traction wheel axle turns and the stud 18 is set. This side bar 53 however is adjustable on the frame horizontal member 13, in the direction of its own length, so that when the sprocket is moved to change adjustment of the chain, the traction wheel 15 is moved with it, forward or back in the frame with the gears 16, 17, remaining always in perfect mesh; and after being so moved it can be clamped rigid again by bolt 54 and by the nuts on stud 18.

The connection of the engine to the traction wheel is permanent, in the sense that there is no clutch. A clutch might be installed if desired, but it is one feature of the invention that the extra complication, expense, width and weight of such is avoided, the function being performed by providing for stopping the traction at any instant, while the engine continues running. The operator does this by lifting the traction wheel from the ground by depressing handles 10. The frame then acts as a lever about the support 30 as a fulcrum. The speed of engine can be reduced coincidently by the spark lever 50. A swing standard (not shown) or other device, such as is common to hold bicycles and motor cycles, may be used to hold the traction wheel thus while it continues to rotate; or if it is desired to stop the engine that can readily be done by the button switch 47. The engine is readily started by pushing the apparatus forward with the traction wheel on the ground.

Either end of the apparatus thus described can be used for work. Figs. 1, 3, 4 and 7 illustrate its use for operating cultivator tools 40 at the rear. The draw bar 35 extends transversely, being a piece of angle steel having slots 60 in its horizontal flange (Fig. 7) in which any suitable tools 40 may be set and secured; and having three holes and bolts 61 in its vertical flange (Fig. 4) for its own attachment to the frame through yoke 35'. By omitting the two outer of these bolts, retaining the central one, a swivel connection is made, so that the bar 35 can be tipped to any lateral angle, and may thus be parallel to the ground on any side hill although the apparatus itself be held in a vertical plane. The traction yoke 35' extends more or less horizontally to the rear from the lower end of the supporting yoke 29, on which it is pivoted at the axle of the supporting wheel 30. It is held up at any desired level by a chain 67; and is guided, strengthened, and at times is also held by side tie bars 35" (Fig. 3). In use this tie is loose, (Fig. 1). The connection to it is by a slot 62 with notch 63 at one end and a pin or bolt 64 projecting from the supporting yoke passing loosely through the slot and adapted to engage in the notch, into which a spring 65 pulls it and holds it when the notch and bolt register together. This latch can be released by the operator by depressing the yoke release lever 66 with his foot. This lever is fulcrumed on the bottom stiff link of the chain 67 and lifts the notch 63 away from the bolt 64 so that the yoke 35' swings down with this bolt sliding in the slot until the tool 40 rests on the ground. The inclination of the blades causes the tool to enter the ground when forward motion begins or continues until the stresses are balanced, unless its depth is restricted by the chain 67, which can be hooked at any desired length. To raise the tool at any instant the operator merely dips the handles 10. This swings the bolt 64 down around the foot of the supporting wheel as a center until, by catching in the notch 63, it picks up the tool-holding tie 35" and raises the tool as the operator allows the handles 10 to rise, the traction meanwhile being stopped because this action raises the wheel 15 temporarily. When the handles have been raised the tool can be dropped by a touch on the foot lever. Other tools or appliances can be attached in the same place. The apparatus can be used as a tractor without the supporting wheel 30, in which case the handles in the hands of the walking operator constitute the rear support. Assuming that a support is used, it is preferably a single wheel arranged in tandem with the traction wheel, and preferably is put in the position illustrated rather than in the reverse arrangement with the traction wheel to the rear and the support forward, for the manipulation and general operation is considerably superior for ordinary purposes, when thus arranged, as illustrated. For example, the operator has the option in guiding, either to raise the handles so as to lift the support clear, when he has the maximum tractive effort directly on the traction wheel, or can turn directly on it; or to depress them and thus to turn on the support; and in this latter case he can swing and set the traction wheel a little directly to either side of its position. The tandem wheels not only track in a narrow space, but they permit of guidance to either side, unlike a four wheeled tractor. Experience shows that when the whole is tipped to right or left on soft earth, which can readily be done by the spread handles 10, the traction wheel runs somewhat toward the side. This facilitates management when working between rows of crops, to work nearer to either side. Where mere steering is wanted without the traction wheel being lifted, or where some appliance on wheels is to be driven in advance, as a lawn mower or truck, the rear yoke 29 and supporting wheel 30 may be replaced with a plate 29' and caster wheel 30', as shown in Fig. 8. In such a case the lawn mower 70 is pushed in front of the tractor, as in Fig. 9, being connected by a pair of push rods 69 pivoted to the side bars 13 of the frame at 71. To turn, the operator depresses the handles enough to lift the tractor, and can then direct the lawn mower, truck or other appliance that is being pushed, the caster wheel turning as needed.

Figs. 10 and 11 illustrate the application of the tractor as a device for carrying something directly, as distinguished from drawing or pushing a separate tool or appliance. In this case a tank 80 of insecticide liquid is suitably supported on the tractor, provided with an air pump 81 and pipe 82 to create air pressure within it, a discharge pipe 83 extending laterally in both directions to nozzles 84, extending over several rows if desired, with a control valve 85 worked by a rod 86 arranged within reach of the operator at the handles 10. A safety valve and filling spout are indicated combined at 87.

The tractor as a whole therefore, can be usefully applied for many purposes, and with advantages not possessed by four wheel apparatus. The width of the lower part of the frame, which may be only seven or eight inches, or less, allows for work between narrowly spaced rows; and the weight of the whole may be well within the power of a man to manage, especially with the leverage on the supporting foot wheel, and yet may be so heavily imposed on the traction wheel as to make the traction effective.

I claim as my invention:

1. A tractor comprising, in combination, a frame with engine, traction wheel, fulcrum ground support, and rear manipulating handle constituting a wheel-lifting lever; and rear means for drawing an implement on the ground, movably attached; the movable characteristic of the attachment permitting the operator to swing said lever on the ground fulcrum while said implement is in operating position on the ground, thereby raising the traction wheel from the ground, without thereby moving said implement up or down.

2. A tractor having a rear draw bar adapted for attaching an implement, combined with a frame, to which the draw bar is movably attached, with engine, traction wheel, ground fulcrum support and rear handle; the whole, including the attachment of bar and implement, being arranged and adapted for the operator by said handle to swing the frame about the ground fulcrum while said implement is in operating position, thus raising the traction wheel from the ground, without thereby moving said implement up or down.

3. A tractor comprising, in combination, a frame with engine; fore and aft ground supports therefor; and rear handles; the fore support being a traction wheel permanently connected to the engine, the aft support a fulcrum normally running on the ground, the handles still farther to the rear, and the whole arranged with the said elements so proportioned and disposed relative to one another as to constitute a lever whereby the weight normally supported on the ground by said traction wheel is lifted with effort easily executed by the ordinary man operator applied to the handles, and the traction wheel is raised from position of rest on the ground on initial depression of the handles by said effort.

4. A tractor comprising, in combination, a frame with engine; a central forward traction wheel; a central supporting wheel behind it constituting a fulcrum; and a manipulating handle farther to the rear; a substantial but minor part of the weight being to the rear of the supporting wheel, thereby aiding the lifting of the traction wheel by depressing the handle.

5. A tractor having, in combination, a frame with traction wheel, engine, ground fulcrum, and flexibly attached rear draw bar, said elements being distributed in a line with the points of attachment arranged at a low elevation along the middle of the frame; and lever handles farther to the rear, above and at the sides of the frame, whereby working stresses of weight and draft are incident upon the frame along a low central fore and aft line, and the handles work approximately vertically with favorable leverage to control fore and aft and lateral tipping of the frame about any part of the wheel base.

6. A tractor comprising a frame of semipyramidal shape, arranged with the axis of the pyramid horizontal; combined with a traction wheel at the apex, a supporting wheel at the lower edge of the base, handles at the upper edge of the base, and an engine substantially within the outlines, of the said semi-pyramid.

7. A tractor comprising a rear draw bar for an implement, in combination with a frame, engine, forward traction wheel, a fulcrum support adapted to engage the ground behind the traction wheel, and a handle extending farther backward, constituting a wheel-lifting lever; there being a a movable attachment of frame to draw bar, and the whole being arranged and adapted to permit of the lever being swung about said fulcrum to stop the traction without the draw bar being forced nearer the ground when the implement is in operating position.

8. A tractor comprising, in combination, a frame with engine, forward traction wheel, fulcrum ground support behind the traction wheel, means to swing the wheel up around the fulcrum, rear draw bar for an implement; and a connection of the implement through the draw bar to the frame permitting up and down relative movement when the said swinging occurs.

9. A tractor comprising, in combination, a frame with engine, traction wheel and support; a draw bar at the rear behind the rear support, comprising a yoke adapted to hold a tool and pivoted on a horizontal axis; and means adapted to connect the tractor frame and the yoke to swing the yoke up on its pivot to raise the tool.

10. A tractor comprising, in combination, a frame with engine, traction wheel and support; a draw bar at the rear, comprising a yoke extending rearward horizontally, adapted to hold a tool, and pivoted on a horizontal axis; a tie link extending obliquely upward and forward from the end of the yoke and having a slot and notch; a pin on the frame, extending loosely into said slot and adapted to latch in said notch, whereby the yoke and tool may be held up or allowed to descend.

11. A tractor comprising a frame with engine, and two ground supports, one of which is a traction wheel, arranged for the whole to be tipped around the rear support and a draw bar at the rear, comprising a yoke pivoted on a horizontal axis; combined with means whereby the frame when thus tipped engages the yoke to pick it up.

12. A tractor comprising a frame with engine, and two ground supports, one of which is a traction wheel, arranged for the whole to be tipped around the rear support; and a draw bar at the rear, comprising a yoke pivoted on a horizontal axis; combined with means whereby the frame when thus tipped engages the yoke to pick it up; and a lever adapted to be reached by the operator's foot to release said engagement.

13. A tractor comprising a frame with an engine, single traction wheel, and manipulating handles, whereby the whole apparatus may be balanced in a vertical plane while running on a side slope; a draw bar secured to the frame extending perpendicularly to the plane of the wheel, and having side and central bolt holes; and bolts adapted to secure a tool thereon; the central bolt alone making a swivel connection for the tool on a fore and aft axis, whereby it can lie parallel to the slope of the hill, and the side bolting preventing said swiveling.

14. A tractor comprising, in combination, a frame with engine, single forward traction wheel, rear ground fulcrum support, rear handles for lifting the traction wheel about the fulcrum; side links extending forward of the traction wheel, adapted to engage a thing pushed by the tractor, and pivoted to the frame on a transverse horizontal axis; whereby the lifting of the traction wheel does not raise the thing pushed; said rear fulcrum support being a caster wheel, whereby the thing pushed may be steered about the traction wheel tread as a fulcrum.

15. A tractor comprising, in combination, a frame with engine, single forward traction wheel having a tread sufficiently narrow to act as a fulcrum in steering, rear ground fulcrum support adapted normally to run on the ground carrying part of the load, rear guiding handles; and forward means adapted to engage a thing to be pushed by the tractor; said rear fulcrum support being a caster wheel whereby the thing pushed may be steered about the traction wheel tread as a fulcrum.

16. A tractor comprising, in combination, a frame with engine, forward traction wheel, rear ground fulcrum support, rear handles for lifting the traction wheel about the fulcrum; side links extending forward of the traction wheel, adapted to engage a thing pushed by the tractor, and pivoted to the frame on a transverse horizontal axis whereby the lifting of the traction wheel, thereby stopping the traction, does not raise the thing pushed.

17. A tractor comprising a frame with engine, traction wheel, sprocket chain connection, and interconnected journals of the traction wheel and of the sprocket wheel which meshes therewith, mounted movably on the frame, whereby the chain sprocket gear and traction wheel gear remain permanently in mesh and move together when the chain sprocket is moved for adjustment of the chain.

18. A tractor having a frame with engine and forward traction wheel; a rear pivoted ground fulcrum support, and farther to the rear a manipulating handle, constituting a wheel-lifting lever; combined with a ground operating implement hinged on the axis of the pivot of said fulcrum support and not participating in the movement of the frame when the operator swings the frame and traction wheel about the said fulcrum, whereby the traction is stopped without the implement being depressed.

19. A tractor having a frame with engine and forward traction wheel; a rear pivoted ground fulcrum support, and farther to the rear a manipulating handle, constituting a wheel-lifting lever; combined with a ground operating implement drawn by the tractor and whose attachment is associated with said fulcrum, connected and arranged so as not to participate in the movement of the frame when the operator swings the frame and traction wheel about the said fulcrum to stop the traction.

20. A tractor having, in combination, a frame, engine, forward traction wheel, rear fulcrum ground support normally running on the ground, and farther rear manipulating handle, constituting a lever adapted to lift the traction wheel; the engine and its incidental apparatus being arranged with considerable of their weight imposed on the fulcrum support; and the whole being arranged for unimpeded backward swing of said lever, sufficient to raise the traction wheel from the ground without changing the relation of the thing drawn to the ground.

21. A tractor comprising, in combination, a frame with engine, forward traction wheel, fulcrum ground support, and farther rear manipulating handle, constituting a lever adapted to lift the traction wheel; the apparatus being at the rear free from any such engagement with the ground or with a thing drawn as will impede a swinging of the lever backward over said fulcrum sufficient for the operator to prevent traction by depressing said handle and being adapted for connection to the thing drawn such that the said sufficient swinging from normal position of rest on the ground does not change the relation of the thing drawn to the ground.

Signed at Boston, Massachusetts, this eighth day of August, 1919.

GEORGE H. NOBBS.